United States Patent
Yoon

(10) Patent No.: US 8,670,954 B2
(45) Date of Patent: Mar. 11, 2014

(54) TRAIN LOAD MEASURING SYSTEM AND METHOD THEREOF

(75) Inventor: Young Hwan Yoon, Seoul (KR)

(73) Assignee: LSIS Co., Ltd., Anyang-Si, Gyeonggi-Do (KR)

(*) Notice: Subject to any disclaimer, the term of this patent is extended or adjusted under 35 U.S.C. 154(b) by 268 days.

(21) Appl. No.: 13/100,221

(22) Filed: May 3, 2011

(65) Prior Publication Data

US 2011/0276309 A1    Nov. 10, 2011

(30) Foreign Application Priority Data

May 10, 2010 (KR) .................. 10-2010-0043624

(51) Int. Cl.
*G01G 9/00* (2006.01)
*G01G 19/04* (2006.01)
*G01G 19/14* (2006.01)
*G01G 19/03* (2006.01)

(52) U.S. Cl.
USPC ............. 702/174; 702/173; 702/175; 701/19; 701/20; 701/70

(58) Field of Classification Search
USPC ................. 702/173, 174, 175; 701/19, 20, 70
See application file for complete search history.

(56) References Cited

U.S. PATENT DOCUMENTS

| | | | | |
|---|---|---|---|---|
| 4,134,464 A | * | 1/1979 | Johnson et al. | 177/3 |
| 5,215,154 A | * | 6/1993 | Kirby | 177/136 |
| 6,580,976 B1 | * | 6/2003 | Belcea | 701/20 |
| 7,522,990 B2 | * | 4/2009 | Daum et al. | 701/123 |
| 7,590,485 B2 | * | 9/2009 | Daum et al. | 701/123 |
| 2007/0203621 A1 | * | 8/2007 | Haugen et al. | 701/19 |
| 2010/0023190 A1 | * | 1/2010 | Kumar et al. | 701/20 |

FOREIGN PATENT DOCUMENTS

| | | | |
|---|---|---|---|
| JP | 405142020 A | * | 6/1993 |
| JP | 05-211701 | | 8/1993 |
| KR | 10-2000-0068450 | | 11/2000 |
| KR | 10-2005-0081992 | | 8/2005 |

* cited by examiner

*Primary Examiner* — Janet Suglo
(74) *Attorney, Agent, or Firm* — Lee, Hong, Degerman, Kang & Waimey

(57) ABSTRACT

Disclosed is a train load measuring system and a method thereof. The train load measuring system includes a speed/acceleration measuring unit, a position measuring unit, a railway-line state receiving unit, a driving/braking force receiving unit and a calculate unit. The speed/acceleration measuring unit measures a speed and acceleration of the train. The position measuring unit measures a current position of the train. The railway-line state receiving unit receives a railway-line state. The driving/braking force receiving unit receives driving and braking forces of the train. The calculating unit calculates a train load based on information transferred from the units.

4 Claims, 2 Drawing Sheets

TRAIN LOAD MEASURING SYSTEM AND METHOD THEREOF

CROSS-REFERENCE TO RELATED APPLICATION

Pursuant to 35 U.S.C. §119(a), this application claims the benefit of earlier filing data and right of prority to Korean Patent Application No. 10-2010-0043624, filed May 10, 2010, the contents of which are all hereby incorporated by reference herein in its entirety.

BACKGROUND OF THE INVENTION

1. Field of the Invention

An aspect of the present invention relates to a train load measuring system and a method thereof, which can measure, a train load including passengers and cargo in real time.

2. Description of the Related Art

In general, signal control equipment technologies in a train field are configured to prevent train accidents in advance and secure safe operations, and include various kinds of signal devices and control systems for improving train operation efficiency.

The signal control equipment is classified into a track circuit device for controlling the trace of a train, an interlocking device, a railway-line switching device, a centralized train control device, a block system for controlling a distance between trains, an automatic train stop device, an automatic train control device, an automatic train operating device, an operation security and informatization equipment.

The signal control equipment is also provided with a train load measuring system and method thereof, which measures the train load in real time so as to stably control a train speed, to estimate the number of passengers between railway stations, to detect an overload when automatically controlling the train by measuring the train load.

A load valve directly mounted in a train is currently used as the train load measuring system. A sensing rod is provided to the load valve to mechanically sense the train load while moving in a straight line.

However, the load valve must be mounted directly in the train, which may cause durability problem. Further, an error according to the load state may occur.

A system of measuring the train load by mounting a train gauge on a railway line through which the train passes and measuring a bent degree of the railway line using the train gauge is used as the train load measuring system.

However, in a case where the strain gauge is used, the durability problem may be caused due to the strain gauge mounted on the railway line. Since a sensor such as the strain gauge is influenced by various external environments including temperature and the like, in addition to the bending of the railway line, it is difficult to accurately measure a train load.

SUMMARY OF THE INVENTION

Embodiments of the present invention provide a train load measuring system and method thereof, which can measure the train load based on information applied from various types of sensors and measuring devices mounted in the train, and a method thereof.

Embodiments of the present invention also provide a train load measuring system and method thereof needs no direct mount on a train or on a railway line, thereby solving the durability problem, and a method thereof.

Embodiments of the present invention also provide a train load measuring system and method thereof, which measures the train load based on information applied from sensors and measuring devices mounted in the train, and a method precisely measuring the train load in real time.

According to an aspect of the present invention, there is provided a load train measuring system, the system including: a speed/acceleration measuring unit configured to measure a speed and acceleration of the train; a position measuring unit configured to measure a current position of the train; a railway-line state receiving unit configured to receive a railway-line state; a driving/braking force receiving unit configured to receive driving and braking forces of the train; and a calculating unit configured to calculate a train load based on information transferred from the units.

Preferably, a speedometer and an accelerometer, installed in the train, used as the speed/acceleration measuring unit.

Preferably, a position measuring device installed in the train so as to measure the current position of the train is used as the position measuring unit. Preferably, a calculating unit that calculates a train position using speed information received from the speed/acceleration measuring unit is used as the position measuring unit.

Preferably, the railway-line state receiving unit senses a railway-line state at the current position of the train by receiving railway-line slope information at the current position of the train, transferred from a railway-line slope database, receiving railway-line curve information at the current position of the train, transferred from a railway-line curve database, and receiving weather information transferred from a weather information center.

Preferably, the calculating unit calculates the train load based on the following expression;

$$W = mg = \left(F - r_2 V_2 - \frac{k}{\rho}\right)\frac{g}{a} + (r_0 + r_1 V + \sin\theta)g$$

where 'F' denotes a driving or braking force of a train, '$R_R$,' '$R_G$' and '$R_C$' denote a driving resistance, a gradient resistance and a curve resistance for the train, respectively, 'V' denotes a speed of the train, 'a' denotes an acceleration of the train, 'm' denotes a mass of the train, 'W' denotes a train load, '$r_0$,' '$r_1$' and '$r_2$' denote coefficients of a driving resistance model, 'θ' denotes a railway-line slope angle, 'ρ' denotes a railway-line curve radius, 'g' denotes gravity, and 'k' denotes a curve resistance coefficient.

According to an aspect of the present invention, there is provided a train load measuring method, the method including: measuring a speed and acceleration of the train; measuring a current position of the train; receiving a current railway-line state from railway-line gradient information, railway-line curve information and weather information; receiving driving and braking forces of the train; and calculating a train load based on information on the speed and acceleration of the train, the current position of the train and the current railway-line state.

The method may further include storing, in a database, the train load for each railway station, calculated in the calculating of the train load, and the number of passengers of each railway station, calculated from the train load.

The method may further include deriving a reference train load and a reference number of passengers of each railway station based on information stored in the database, and performing correction by comparing the information stored in the database with the train load for each railway station, calculated at the current position of the train.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Hereinafter, exemplary embodiments of the present invention will be described in detail with reference to the accompanying drawings. In the following description, detailed explanation of known related functions and constitutions may be omitted to avoid unnecessarily obscuring the subject manner of the present invention. Further, the terms used in the description are defined considering the functions of the present invention and may vary depending on the intention or usual practice of a user or operator. Therefore, the definitions should be made based on the entire contents of the description.

Figure 1:
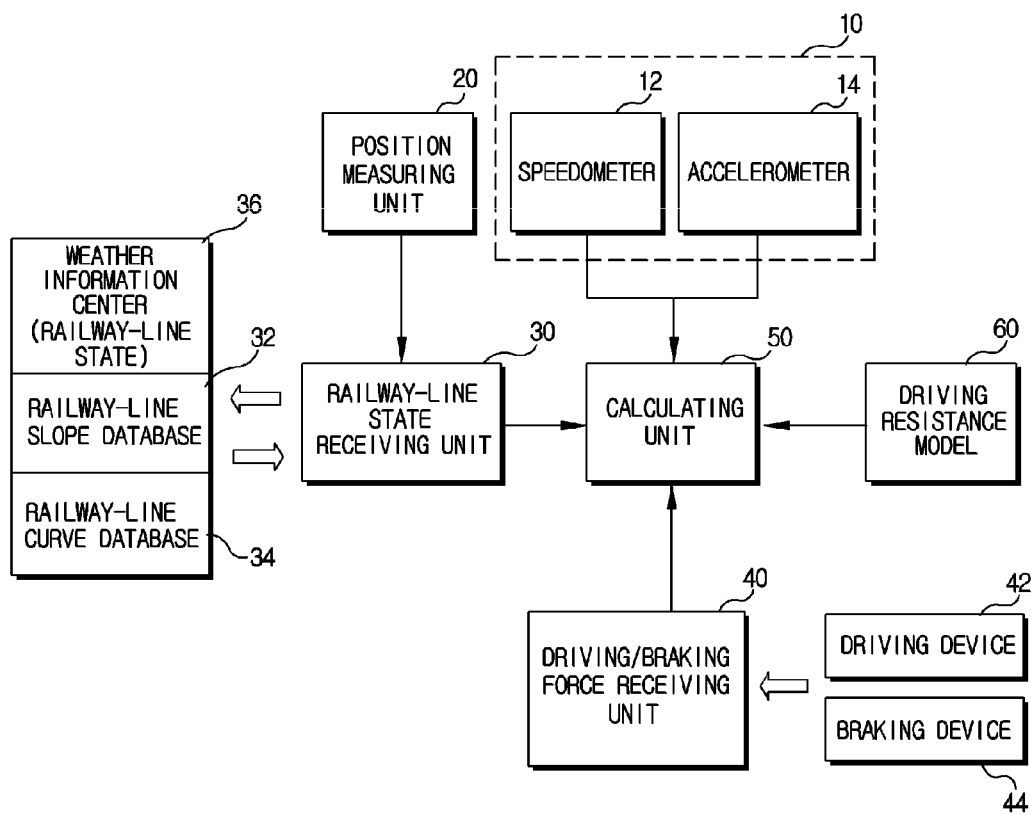
FIG. 1 is a block diagram showing a load measuring system for a train according to an embodiment of the present invention.

FIG. 1 is a block diagram showing a train load measuring system for a train according to an embodiment of the present invention.

As shown in FIG. 1, the system according to the embodiment of the present invention includes a speed/acceleration measuring unit 10 that measures the speed and acceleration of the train, a position measuring unit 20 that measures the current position of the train, a railway-line state receiving unit 30 that receives railway-line state information, a driving/braking force receiving unit 40 that receives driving and braking forces of the train, and a calculating unit 50 that calculates the train load based on information applied from the units.

Since a speedometer 12 and an accelerometer 14, which are installed in the train, may be used as the speed/acceleration measuring unit 10, it is unnecessary to install a separate speed/acceleration measuring unit in the train. The speedometer 12 measures a current speed of the train and transfers the measured speed to the calculating unit 50. The accelerometer 14 measures a current acceleration of the train and transfers the measured acceleration to the calculating unit 50.

The position measuring unit 20 is installed in the train and transfers, in real time, current position information of the train to the calculating unit 50.

The position measuring unit 20 may measure the position of the train using speed information received from the speedometer 12 of the speed/acceleration measuring unit 10, and a more exact position measurement is possible using a separate measuring unit.

In a case where the position of the train is calculated using the speed information received from the speed/acceleration measuring unit 10, the position measuring unit 20 may be configured as only a calculating device for processing the information received from the speed/acceleration measuring unit. The operating function of the calculating device may be performed by a calculating device of an automatic train protection (ATP) system controller. Thus, the configuration of the position measuring unit 20 can be simplified.

The railway-line state receiving unit 30 receives railway-line gradient information of the current position of the train, transferred from a railway-line slope database 32, railway-line curve information of the current position of the train, transferred from a railway-line curve database 34, and current weather information transferred from a weather information center 36. Then the railway-line state receiving unit 30 transfers railway-line state information to the calculating unit 50.

An existing receiving unit built in a train control device for ATP may be used as the railway-line state receiving unit 30. Alternatively, a separate receiving unit may be provided as the railway-line state receiving unit 30.

The driving/braking force receiving unit 40 receives a driving force of the train, transferred from a driving device 42 of the train, and a braking force of the train, transferred from a braking device 44 of the train, and transfers the driving and braking forces to the calculating unit 50.

The load measuring system further includes a driving resistance model 60. The driving resistance model 60 is a driving resistance model according to the load and speed of the train. The calculating unit 50 calculates the train load based on information transferred from the driving resistance model 60.

The calculating unit 50 estimates a current train load based on the information transferred from the aforementioned units and the driving resistance model 60, and a calculating unit such as a controller for ATP, which is previously installed in the train, may be used as the calculating unit 50. Alternatively, a separate calculating unit may be used as the calculating unit 50.

The calculation of the train load in the calculating unit 50 may be performed by the following equations.

The following equations are used as a method for calculating the train load in the calculating unit, and may be changed depending on a model used.

In the following equations, 'F' denotes a driving or braking force of a train, and '$R_R$,' '$R_G$' and '$R_C$' denote a driving resistance, a gradient resistance and a curve resistance for the train, respectively. 'V' denotes a speed of the train, 'a' denotes an acceleration of the train, and 'm' denotes a mass of the train. 'W' denotes a train load, and 'k' denotes a curve resistance coefficient.

Generally, the driving resistance model of a train is used in the form of a formula related to speed and load, i.e., a quadratic equation related to speed.

For example, quadratic equation $R_R = (r_0 + r_1 V)W + r_2 V^2$ may be used.

Here, coefficients '$r_0$,' '$r_1$' and '$r_2$' of a driving resistance model may be changed depending on the state of a railway line.

When the slope angle is defined by 'θ,' the driving resistance of the train may be obtained by $R_R = mg \cdot \sin \theta$. When the railway-line curve radius is defined by 'ρ,' the curve resistance of the train may be approximately obtained by $R_C = k/\rho$.

The kinetic equation of the train is expressed as follows.

$$ma = F - R_R - R_G - R_C$$

$$ma + (r_0 + r_1 V)mg + mg \sin \theta = F - r_2 V^2 - R_C$$

Thus, the load W of the train may be evaluated by the following equation.

$$W = mg = \left(F - r_2 V^2 - \frac{k}{\rho}\right)\frac{g}{a} + (r_0 + r_1 V + \sin\theta)g$$

As described above, the load 'W' of the train can be evaluated by evaluating the driving/braking force 'F' of the train, the speed 'V' of the train and the acceleration 'a' of the train, receiving information on the slope angle 'θ' and the curve radius 'ρ' and then selecting coefficients '$r_0$,' '$r_1$' and '$r_2$' of a suitable driving resistance model among driving resistance models previously defined according to the railway-line state.

Figure 2:
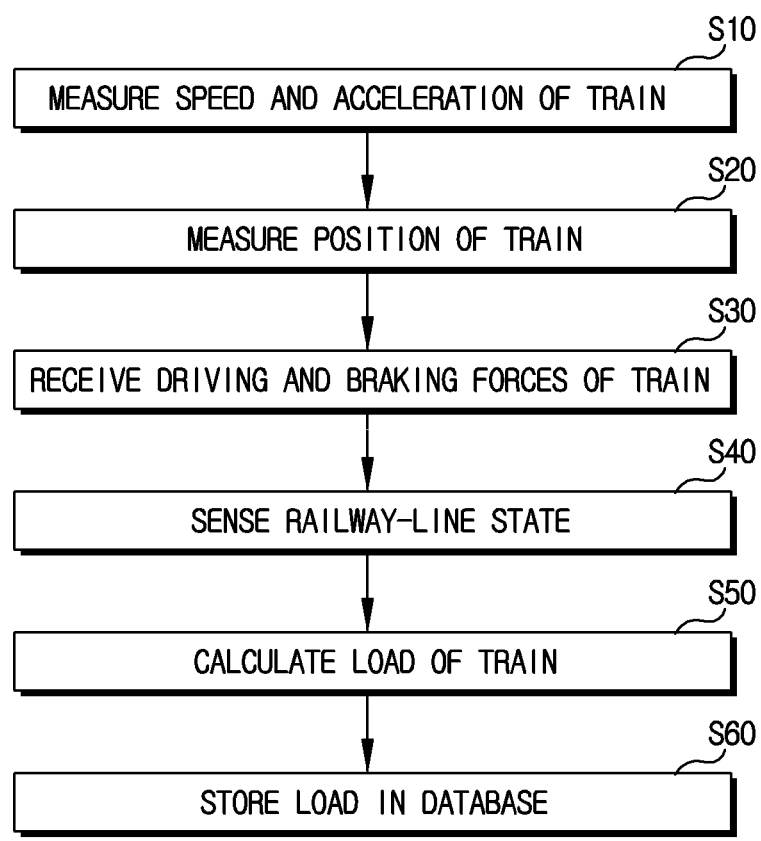
FIG. 2 is a flowchart illustrating a load measuring method for a train according to an embodiment of the present invention.

FIG. 2 is a flowchart illustrating a load measuring method for a train according to an embodiment of the present invention.

First, information of the train, required in calculating the train load, is collected.

That is, the speed and acceleration of the train are measured (S10). The speed of the train is transferred from the speedometer 14, and the acceleration of the train is transferred from the accelerometer 12.

The position of the train is measured (S20). Information on a current position of the train is transferred from the position measuring unit 20.

The driving and braking forces of the train are received (S30). If information on the driving and braking forces of the train is transferred to the driving/braking force receiving unit 40 from the driving device 42 and the braking device 44, the driving/braking force receiving unit 40 transfers the information to the calculating unit 50.

If the collection of information on the train is completed, railway-line state information that has influence on the driving of the train at a current position is collected.

That is, the railway-line state receiving unit 30 receives railway-line slope information from the railway-line slope database 32 and receives railway-line curve information from the railway-line curve data base 34. The railway-line state receiving unit 30 also receives weather information from the weather information center 36 and then provides these pieces of information to the calculating unit 50 (S40).

For example, the train receives various kinds of forces when it is operated. When the train is in course of driving, it receives a driving force applied by an engine or the like. When the train is in course of braking, it receives a braking force applied by the braking device. In addition, the train receives a driving resistance according to the speed of the train, a gradient resistance according to the slope of a railway line, and a curve resistance when it drives on a curved railway line. The driving resistance of the train may include various kinds of resistances such as a frictional force and an air resistance. Among these resistances, the friction between the train and the railway line may change adherence properties according to conditions such as weather.

If the various pieces of information of the train are transferred to the calculating unit 50, the calculating unit 50 selects a driving resistance model of the train, suitable for the current railway-line environment among the driving resistance models.

The calculating unit 50 calculates a current train load based on the information described above (S50).

The number of passengers who board the train for each railway station is calculated based on the train load, calculated by the calculating unit 50.

The train load and the number of passengers for each railway station are stored in a database, and the reference train load and the reference number of passengers for each railway station in the current operation condition are derived based on the stored information (S60).

Correction is performed by comparing the information stored in the database with the current train load for each railway station.

In a train load measuring system and method thereof according to the present invention, since a calculating unit calculates the train load based on information transferred by a speed/acceleration measuring unit for measuring a speed and acceleration of the train, a position measuring unit for measuring a current position of the train, a railway-line state receiving unit for receiving a railway-line state and a driving/braking force receiving unit for receiving driving and braking forces of the train, it is unnecessary to install a separate measuring device in the train or on a railway line, and there is no problem of durability for a long period of time.

Further, since the train load can be calculated in real time when the train is in course of driving, the train load can be exactly measured, and data on the train load can be continuously corrected and updated.

Although the present invention has been described in connection with the preferred embodiments, the embodiments of the present invention are only for illustrative purposes and should not be construed as limiting the scope of the present invention. It will be understood by those skilled in the art that various changes and modifications can be made thereto within the technical spirit and scope defined by the appended claims.

What is claimed is:

1. A train load determining system, the system comprising:
a speed/acceleration measuring unit configured to measure a speed and an acceleration of a train;
a position measuring unit configured to measure a current position of the train;
a railway-line state receiving unit configured to receive a railway-line state;
a driving/braking force receiving unit configured to receive information relating to driving and braking forces of the train;
a calculating unit configured to calculate a train load based on information transferred from the speed/acceleration measuring unit, the position measuring unit, the railway-line state receiving unit, and the driving/braking force receiving unit; and
wherein the railway-line state receiving unit receives the railway-line state at the current position of the train by:
receiving railway-line slope information related to the current position of the train, wherein the railway-line slope information is received from a railway-line slope database;
receiving railway-line curve information related to the current position of the train, wherein the railway-line curve information is received from a railway-line curve database; and
receiving weather information, wherein the weather information is received from a weather information center;
wherein the calculating unit calculates the train load based on the following expression:

$$W = mg = \left(F - r_2 V_2 - \frac{k}{\rho}\right)\frac{g}{a} + (r_0 + r_1 V + \sin\theta)g;$$

where:
'F' denotes a driving or braking force of the train;
'V' denotes the speed of the train;
'a' denotes the acceleration of the train;
'm' denotes a mass of the train;
'W' denotes the train load;
'$r_0$,' '$r_1$' and '$r_2$' denote coefficients of a driving resistance model;
'θ' denotes railway-line slope angle;
'ρ' denotes railway-line curve radius;

'g' denotes gravity; and

'k' denotes curve resistance coefficient.

2. The system of claim 1, wherein the speed/acceleration measuring unit comprises a speedometer and an accelerometer.

3. The system of claim 1, wherein the position measuring unit comprises a position measuring device installed in the train.

4. The system of claim 1, wherein the position measuring unit comprises a calculating unit that calculates the position of the train using speed information received from the speed/acceleration measuring unit.

* * * * *